United States Patent [19]

Jacobus et al.

[11] Patent Number: 5,629,594

[45] Date of Patent: May 13, 1997

[54] FORCE FEEDBACK SYSTEM

[75] Inventors: Charles J. Jacobus; Alan J. Riggs; Mark J. Taylor, all of Ann Arbor, Mich.

[73] Assignee: Cybernet Systems Corporation, Ann Arbor, Mich.

[21] Appl. No.: 543,606

[22] Filed: Oct. 16, 1995

Related U.S. Application Data

[60] Continuation-in-part of Ser. No. 257,070, Jun. 9, 1994, Pat. No. 5,459,382, which is a division of Ser. No. 984,324, Dec. 2, 1992, Pat. No. 5,389,865.

[51] Int. Cl.$^6$ .............................. F16D 31/02; G05G 9/02
[52] U.S. Cl. .................... 318/568.11; 318/568.1; 318/590; 395/95; 901/7; 901/9
[58] Field of Search ....................... 318/560–646; 364/806, 146, 578; 901/3, 5, 7, 9, 15–23, 40–50; 414/730–735; 74/471; 395/80–99, 152, 161; 33/366, 377, 312, 313; 434/307, 43, 69

[56] References Cited

U.S. PATENT DOCUMENTS

| | | | |
|---|---|---|---|
| 3,133,649 | 5/1964 | Serrell | 214/1 |
| 3,139,990 | 7/1964 | Jelatis et al. | 214/1 |
| 3,168,203 | 2/1965 | Gallistel | 214/1 |
| 3,171,549 | 3/1965 | Orloff | 214/1 |
| 3,241,687 | 3/1966 | Orloff | 214/1 |
| 3,260,826 | 7/1966 | Johnson | 200/157 |
| 3,263,824 | 8/1966 | Jones et al. | 214/1 |
| 3,296,882 | 1/1967 | Durand | 74/471 |
| 3,350,956 | 11/1967 | Monge | 74/471 |
| 3,409,252 | 11/1968 | Miller | 244/83 |
| 3,447,766 | 6/1969 | Palfreyman | 244/83 |
| 3,449,008 | 6/1969 | Colechia | 294/88 |
| 3,561,263 | 2/1971 | Ward et al. | 73/133 |
| 3,618,786 | 11/1971 | Fick | 214/1 |
| 3,620,095 | 11/1971 | Dane | 74/469 |
| 3,637,092 | 1/1972 | George et al. | 214/1 |
| 3,679,865 | 7/1972 | Jesnitzer et al. | 219/131 |
| 3,771,037 | 11/1973 | Bailey, Jr. | 318/580 |
| 3,920,972 | 11/1975 | Corwin, Jr. et al. | 235/151.11 |
| 3,948,093 | 4/1976 | Folchi et al. | 73/133 |
| 4,021,715 | 5/1977 | Von Hacht et al. | 318/628 |

(List continued on next page.)

OTHER PUBLICATIONS

J.J. Batter, F.P. Brooks, Jr., "Grope–1: A Computer Display to the Sense of Feel," 1972, pp. 759–763.

M. Ouh–Young, D. Beard, F.P. Brooks, Jr., "Force Display Performs Better than Visual Display in a Simple 6–D Docking Task," IEEE 1989, pp. 1462–1466.

N. Hogan, B.A. Kay, E.D. Fasse, F.A. Mussa–Ivald, "Haptic Illusions: Experiments on Human Manipulation and Perception of 'Virtual Objects'," *Cold Spring Harbor Synp. on Quant. Biol.*, vol. LV, 1990, pp. 925–931.

T.G. Zimmerman, J. Lanier, C. Blanchard, S. Bryson, Y. Harvill, "A Hand Gesture Interface Device," *Human Factors in Computing Systems and Graphics Interface*, Apr. 1987, pp. 189–192.

(Author Unknown), "Virtual Reality, Scientific and Technological Challenges," (Date Unknown), pp. 205–230.

I. Sutherland, "The Ultimate Display," *Processing of IFIP Congress 65*, vol. 2, May 1965, pp. 506–508.

(List continued on next page.)

*Primary Examiner*—Paul Ip
*Attorney, Agent, or Firm*—Gifford, Krass, Groh, Sprinkle, Patmore, Anderson & Citkowski

[57] ABSTRACT

A system and method for providing a tactile virtual reality to a user is present. The position and orientation of the user is utilized to generate a virtual reality force field. Forces are in turn generated on the user as a function of this force field. A six-axis manipulator is presented for providing a user interface to such a system. This manipulator provides a unique kinematic structure with two constant force springs which provide gravity compensation so that the manipulator effectively floats.

18 Claims, 16 Drawing Sheets

U.S. PATENT DOCUMENTS

| | | | |
|---|---|---|---|
| 4,150,803 | 4/1979 | Fernandez | 244/135 |
| 4,216,467 | 8/1980 | Colston | 340/365 |
| 4,221,516 | 9/1980 | Haaker et al. | 414/5 |
| 4,229,136 | 10/1980 | Panissidi | 414/673 |
| 4,260,319 | 4/1981 | Motoda et al. | 414/591 |
| 4,302,138 | 11/1981 | Zarudiansky | 414/5 |
| 4,348,142 | 9/1982 | Figour | 414/2 |
| 4,367,532 | 1/1983 | Crum et al. | 364/513 |
| 4,420,808 | 12/1983 | Diamond et al. | 364/434 |
| 4,459,870 | 7/1984 | Gill et al. | 74/471 |
| 4,510,574 | 4/1985 | Guittet et al. | 364/513 |
| 4,511,985 | 4/1985 | Inaba et al. | 364/513 |
| 4,521,685 | 6/1985 | Rebman | 250/229 |
| 4,531,080 | 7/1985 | Nordstrom et al. | 318/628 |
| 4,555,960 | 12/1985 | King | 74/471 |
| 4,604,016 | 8/1986 | Joyce | 414/7 |
| 4,655,673 | 4/1987 | Hawkes | 414/730 |
| 4,661,032 | 4/1987 | Arai | 414/5 |
| 4,680,519 | 7/1987 | Chand et al. | 318/568 |
| 4,795,296 | 1/1989 | Jau | 414/5 |
| 4,837,734 | 6/1989 | Ichikawa et al. | 364/513 |
| 4,853,874 | 8/1989 | Iwamoto et al. | 364/513 |
| 4,887,222 | 12/1989 | Miyake et al. | 364/513 |
| 4,888,538 | 12/1989 | Dimitrov et al. | 318/675 |
| 4,893,981 | 1/1990 | Yoshinada et al. | 414/5 |
| 4,913,000 | 4/1990 | Wyllie | 74/523 |
| 4,914,976 | 4/1990 | Wyllie | 74/523 |
| 4,942,538 | 7/1990 | Yuan et al. | 364/513 |
| 4,973,215 | 11/1990 | Karlen et al. | 414/729 |
| 5,004,391 | 4/1991 | Burdea | 414/6 |
| 5,018,922 | 5/1991 | Yoshinada et al. | 414/5 |
| 5,044,956 | 9/1991 | Behensky et al. | 434/45 |
| 5,053,975 | 10/1991 | Tsuchihashi et al. | 364/513 |
| 5,105,367 | 4/1992 | Tsuchihashi et al. | 365/99 |
| 5,115,178 | 5/1992 | Umeda | 318/568.11 |
| 5,116,180 | 5/1992 | Fung et al. | 414/5 |
| 5,130,632 | 7/1992 | Ezawa et al. | 318/568.11 |
| 5,142,931 | 9/1992 | Menahem | 74/471 |
| 5,155,423 | 10/1992 | Karlen et al. | 318/568.11 |
| 5,193,963 | 3/1993 | McAffee et al. | 414/5 |
| 5,198,736 | 3/1993 | Azuma et al. | 318/568.1 |
| 5,220,261 | 6/1993 | Kempas | 318/567 |
| 5,223,776 | 6/1993 | Radke et al. | 318/568.1 |
| 5,239,160 | 8/1993 | Sakura et al. | 219/121.82 |
| 5,429,140 | 7/1995 | Burdea et al. | 128/774 |

OTHER PUBLICATIONS

J. Ish–Shakom, "Experimental Results of Using a Linear Step Motor as a Programmable Spring," IEEE, 1989, pp. 1841–1846.

M. Ouh–Young, M. Pique, J. Hughes, N. Srinivasan, F.P. Brooks, Jr., "Using a Manipulator for Force Display in Molecular Docking," IEEE 1988, pp. 1824–1829.

W.D. Atkinson, K.E. Bond, G.L. Tribble, K.R. Wilson, "Computing with Feeling," Compu. & Graphics, vol. 2, 1977, pp. 97–103.

P.J. Kilpatrick, "The Use of a Kinesthetic Supplement in an Interactive Graphics System," A Dissertation for the University of North Carolina, 1976.

M. Ouh–Young, "Force Display in Molecular Docking," A Dissertation for the University of North Carolina, 1990.

A.M. Noll, "Man–Machine Tactile Communication," A Dissertation for Polytechnic Institute of Brooklyn, 1971.

M. Ouhyoung, J.R. Wu, W.N. Tsai, T.J. Yang, C.H. Huang, "A Force Feedback Joystick and Its Use in PC Video Games," National Taiwan University.

(Author Unknown) "Virtual Reality, Scientific and Technological Challenges," (Date Unknown) pp. 160–187.

F.P. Brooks, Jr., M. Ouh–Young, J.J. Batter, P.J. Kilpatrick, "Project GROPE—Haptic Displays for Scientific Visualization," Computer Graphics, vol. 24, No. 24, Aug. 1990, pp. 177–185.

M. Minsky, M. Ouh–Young, O. Steel, F.P. Brooks, Jr., M. Behensky, "Feeling and Seeing: Issues in Force Display," pp. 235–243. 1990.

H. Iwata, "Artificial Reality with Force–feedback: Development of Desktop Virtual Space with Compact Master Manipulator," Computer Graphics, vol. 24, No. 4, Aug. 1990, pp. 165–170.

D.W. Repperger, "Biodynamic and Spasticity Reduction in Joystick Control via Force Reflection," U.S. Air Force No. AL/CF–TR–1995–0152, Sep. 1995.

L.B. Rosenberg, "Perceptual Design of a Virtual Rigid Surface Contact," U.S. Air Force No. AL/CF–TR–1995–0029, Apr. 1993.

B.D. Adelstein, M.J. Rosen, "Design and Implementation of a Force Reflecting Manipulandum for Manual Control Research," DSC–vol. 42, ASME 1992, pp. 1–12.

L.A. Jones, I.W. Hunter, "Influence of the Mechanical Properties of a Manipulandum on Human Operator Dynamics," Biological Cybernetics, vol. 62, 1990, pp. 299–307.

M. Russo, A. Tadros, "Controlling Dissipative Magnetic Particle Brakes in Force Reflective Devices," DSC–vol. 42, ASME 1992, pp. 63–70.

P. Fisher, R. Daniel, K. V. Siva, "Specification and Design of Input Devices for Teleoperation," IEEE, 1990, pp. 540–545.

H.Z. Tan, X.D. Pang, N.I. Durlach, "Manual Resolution of Length, Force, and Compliance," DSC–vol. 42, ASME 1992, pp. 13–18.

FORCE FEEDBACK SYSTEM

REFERENCE TO RELATED APPLICATIONS

This is a continuation-in-part of U.S. patent application Ser. No. 08/257,070, filed Jun. 9, 1994, now U.S. Pat. No. 5,459,382, which is a divisional application of Ser. No. 984,324, filed Dec. 2, 1992, now U.S. Pat. No. 5,389,865, issued Feb. 14, 1995.

FIELD OF THE INVENTION

This invention relates to a method and system for implementing a tactile virtual reality environment, and a six-axis manipulator with force feedback defining an interface device therefor.

BACKGROUND OF THE INVENTION

In many applications it is desirable for a user to remotely control the operation of a slave device by means of a hand-controller—a device which senses the movement of a handle gripped by the user's hand and generates one or more control signals which, in turn, are used in directing the actuation of the slave device. Hand controllers are commonly used in applications where the user is necessarily in a location which is remote from the slave, for example, where the slave is in a hazardous environment, such as an environment where high levels of radiation are present. Hand controllers are also well suited for teleoperation in environments where direct viewing is limited. Examples include murky underwater environments with reduced light and obstructions such as underground excavation applications. To improve the sensitivity of the user to the slave's environment, a force-feedback system can be used to reflect the forces generated on the hand back to the user via the hand controller. For instance, if the slave unit impacts an object, the force of the impact is felt by the user's hand.

Force reflecting hand controllers for tele-operation are well known. Units which reflect the force sensed by a remote manipulator are disclosed in U.S. Pat. No. 4,837,734 to Ichikawa et al., U.S. Pat. No. 4,853,874 to Iwamoto et al., U.S. Pat. No. 4,888,538 to Dimitrov et al., U.S. Pat. Nos. 4,893,981 and 5,018,922 to Yoshinada et al., U.S. Pat. No. 4,942,538 to Yuan et al., U.S. Pat. No. 5,004,391 to Burdea, and U.S. Pat. No. 5,053,975 to Tsuchihashi et al. These units use electrical force feedback, usually applied through an electric motor/gear drive, to present the forces sensed by a remote manipulator to the user.

FIG. 1 summarizes the basic operation of prior art devices. The position, velocity, and/or acceleration provided on a master hand controller 10 on a handle 12 by a user (not shown) is sensed and transmitted as a command by a controller 14 to move the slave device 16. In turn, the actual position, velocity, and/or acceleration is read from the slave device 16 and is sent back by the controller 14 as a command to the master hand controller 10, providing the user with direct kinesthetic feedback from the remote device he is controlling.

To simplify control, many prior art devices are a kinematically similar replica of the remote device under control. This kinematic similarity reduces or eliminates the need for a computer controlled interface between the master hand controller unit and the remote slave device. This kinematic similarity requires a unique hand-controller for each unique slave device. Changes made to the kinematics of the slave device require similar changes to the controller.

Prior force reflecting hand controller configurations have used either counter weights or active compensation to remove friction and gravity effects from the controller handle. The use of counterweights increases the mass and moment of inertia of the system which, in turn, increases user reaction time due to the additional forces necessary to accelerate and decelerate the handle. Active gravity compensation increases the complexity of a system while simultaneously increasing the possibility of undesirable system instability.

Further, by reacting to remote forces present on a slave device, the prior art devices lack the capability of creating a three-dimensional tactile virtual reality environment whereby a user's actions and reactions are related to a simulated world such as simulations of driving or flying functions, simulation of molecular force interactions, or simulations of surgical procedures. U.S. Pat. No. 5,044,956 to Behensky et al. discloses a system whereby a steering wheel is used to input positions to a simulation which in turns actuates the wheel in response to simulated artifacts. This system does not disclose or anticipate the simulation and coordination of the six-degrees of freedom required for the arbitrary positioning and orientation of solid objects. Similarly, prior art devices which simulate virtual reality by visual feedback to a user are not capable of accepting tactile inputs and providing tactile force feedback.

SUMMARY OF THE INVENTION

The present invention solves the problems of the prior art by providing a method and system for providing a tactile virtual reality in response to user position and orientation. The present invention further provides a universal device whose kinematics do not necessarily replicate any particular device it might control or simulate. A computer mediated control system is provided which transforms forces, torques, displacements, velocities, and accelerations measured by a simulated environment and applies them to the hand controller or visa versa. The present invention can effect and control the superposition of translational displacement with force application and angular displacement with torque, thus providing arbitrary, programmed application of forces, torques, and displacements to the user in any direction. This allows the device to be controlled by, and to control, external simulations or models as well as physical remote devices. The invention can also locally simulate virtual force fields generated from interaction with virtual surfaces and/or boundaries, can provide software programmed position, velocity, force, and acceleration limit stops, and can dynamically shift, rotate, or scale these virtual objects.

The present invention includes a manipulator for use as a user interface which has a specific joint configuration. This joint configuration yields a design which passively solves the problem of gravity compensation by two constant force springs. Friction in the manipulator is minimized through using a highly back-drivable low gear ratio drive system and high performance brushless DC motors. A general object of the present invention is to provide a tactile virtual reality in response to a 5 user input. According to the present invention, an electric signal is generated for each of a plurality of degrees of freedom of the user as a function of the user position and orientation in three-dimensional space. At least one virtual reality force field is generated in response to the generated signals. A fourth signal is generated for each degree of freedom as a function of the force field, and a tactile force on the user is generated for each force signal.

A further general object of the present invention is to provide a system for providing a tactile virtual reality in response to a user input. The system comprises a six-axis interface device having an actuator for each axis and a member movable by the user. The interface device is responsive to the position and orientation of the member to generate electrical signals representative of this position and orientation. Means are also provided for generating at least one virtual reality force field responsive to the electric signals. In addition, means for generating a force signal for each axis are provided as a function of the force field wherein the actuators are responsive to their respective force signals to provide a force to each axis for creating the tactile virtual reality.

A specific object of the present invention is to provide a six-axis manipulator capable of assuming an arbitrary orientation and position in three-dimensional space for use as a user interface.

A further specific object of the present invention is to provide a six-axis manipulator for use as a user interface having a constant force spring for compensating for the force of gravity.

DETAILED DESCRIPTION OF THE PREFERRED EMBODIMENT

Figure 1:
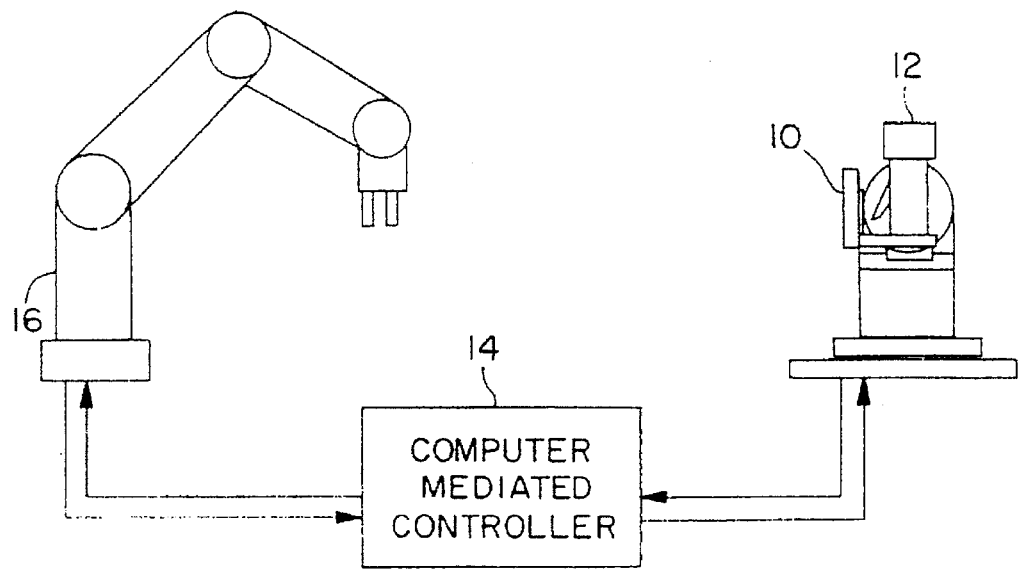
FIG. 1 presents the configuration of prior art hand controllers.
Figure 2:
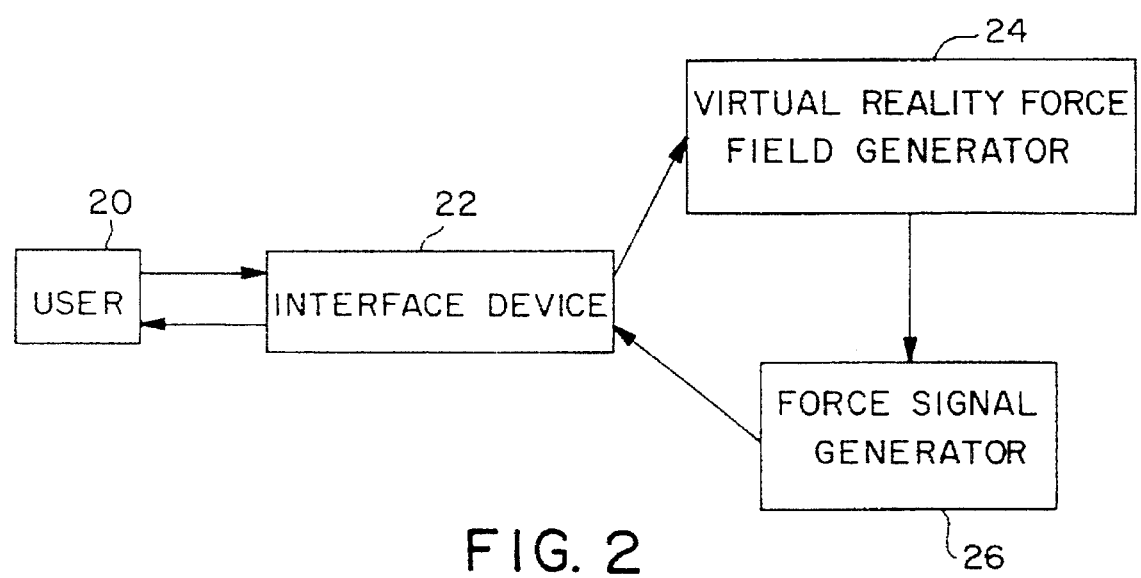
FIG. 2 presents a block diagram representation of the virtual reality system of the present invention.
Figure 3:
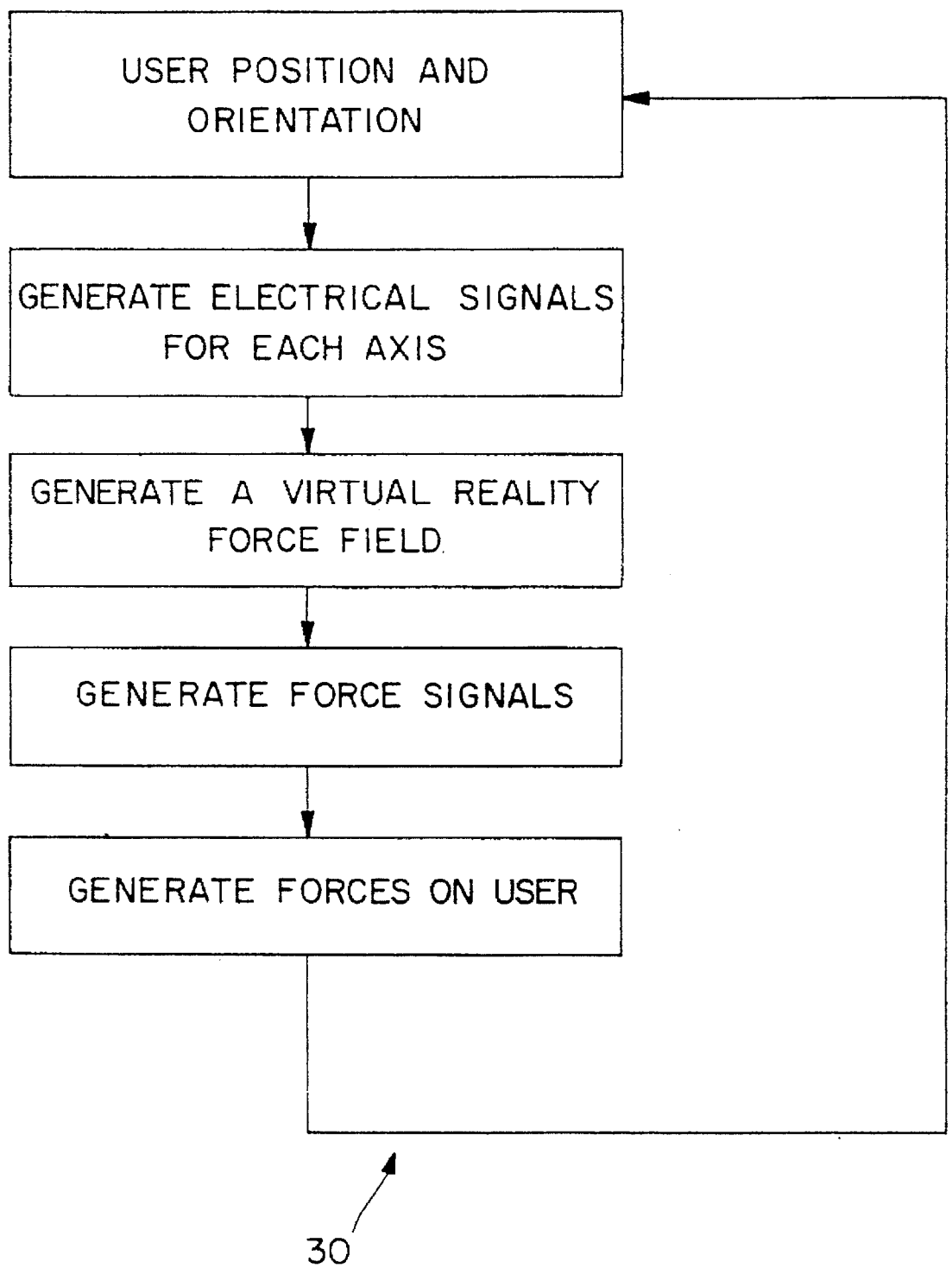
FIG. 3 presents a flow chart representation of the method of the present invention.

The present invention is a system and method for presenting forces to an operator of a remote device or to a user interacting with a virtual environment in multiple axes simultaneously mediated through a computer 15 controlled interface system. A block diagram of the system is shown in FIG. 2. A user 20 provides a position, velocity, and/or acceleration (to be referred to generally as "force") to the user interface 22. The user interface generates an electrical signal for each of a plurality of degrees of freedom of the user corresponding to the motion of the user interface along, or about, the respective degree of freedom. These electrical signals are fed to a virtual reality force field generator 24 which calculates force field values for a selected force field. These force field values are fed to the force signal generator 26 which generates a force signal for each of the plurality of degrees of freedom of the user as a function of the generated force field. These motion commands are feedback to actuators of the user interface 22 which provide such force to the user interface and thus to the user in contact with the interface device. A flowchart of the method corresponding to this system is shown in FIG. 3 and referred to generally by reference numeral 30.

It should be noted that there are a variety of different ways that the user interface could be accomplished. This interface could read the position of a user's hand by means of a laser tracking system and feedback forces by urging the user's hand with jets of air. The interface could consist of a pedal responding to the position and orientation of the user's foot. In the preferred embodiment however, the user's hand will grip a handle on a user interface similar to a hand controller.

Figure 4:
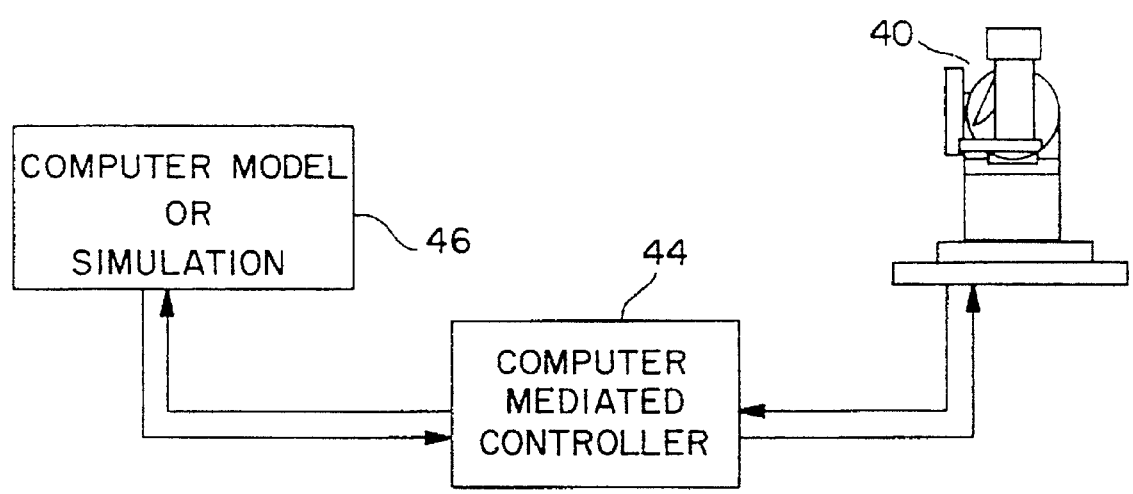
FIG. 4 presents a block diagram representation of the six-axis tactile virtual reality system of the present invention.

Turning now to FIG. 4, a six-axis tactile virtual reality system is presented. The position, velocity, and/or acceleration provided on a master hand controller 40 on handle 42 by a user (not shown) is sensed and transmitted as a command by controller 44 to the computer model or simulation 46 which implements a virtual reality force field. In turn, the force field value for the given position, velocity, and/or acceleration is sent back to the controller 44 which generates a force command to the master hand controller 40, providing the user with direct kinesthetic feedback from the virtual environment traversed.

The invention in its preferred embodiment is applicable to controlling a virtual or simulated environment. However, the invention is also well suited to the control of a remote or physical device. Further, the present invention is suited for application to any number of axes. For instance, a single roll axis could be used to implement a force reflecting steering wheel, a pitch and roll axis could be used to implement a two axis force reflecting joystick, or an X, Y, Z, yaw, pitch, and roll axis could be used to implement an electrically actuated motion simulator. However, the preferred implementation chosen for description herein operates six-axis position, velocity and/or acceleration sensing and force effecting axes simultaneously.

Turning now to FIG. 5, a six-axis embodiment of the manipulator of the present invention is shown. The manipulator, referred to generally by reference numeral 50 is, in effect, a small back drivable robot which moves in 6 degrees of freedom, 3 linear positions (x, y, z) and 3 attitudes (roll, pitch, yaw).

Figure 5A:
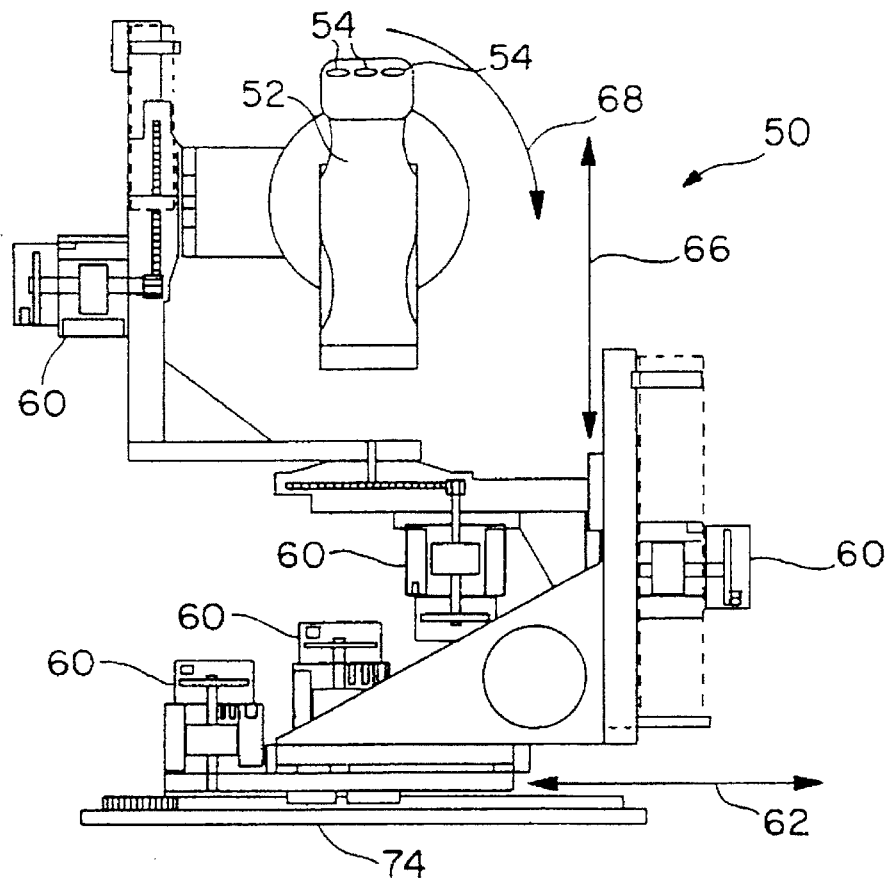
FIG. 5a presents a front view of a six-axis embodiment of the manipulator of the present invention.
Figure 5B:
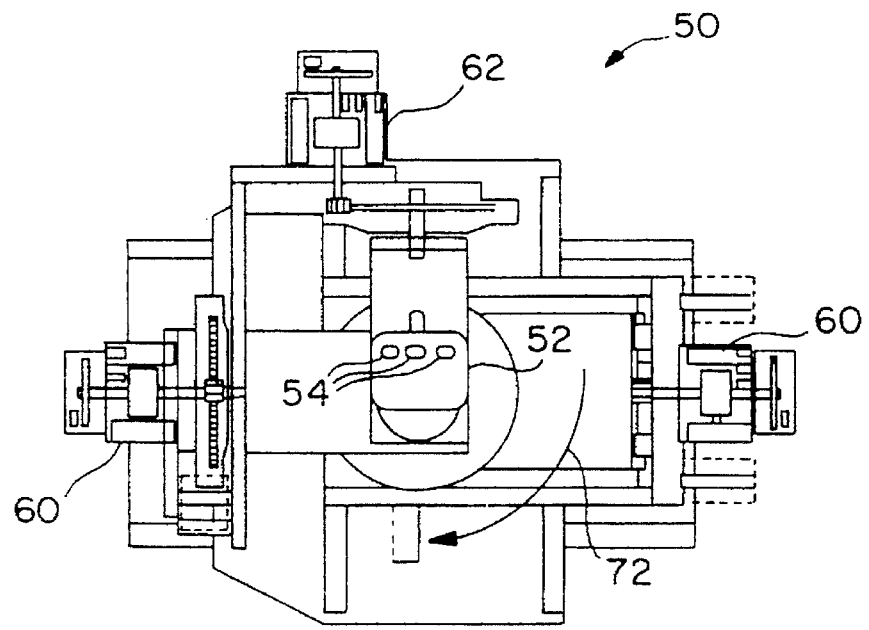
FIG. 5b presents a top view of a six-axis embodiment of the manipulator of the present invention.
Figure 5C:
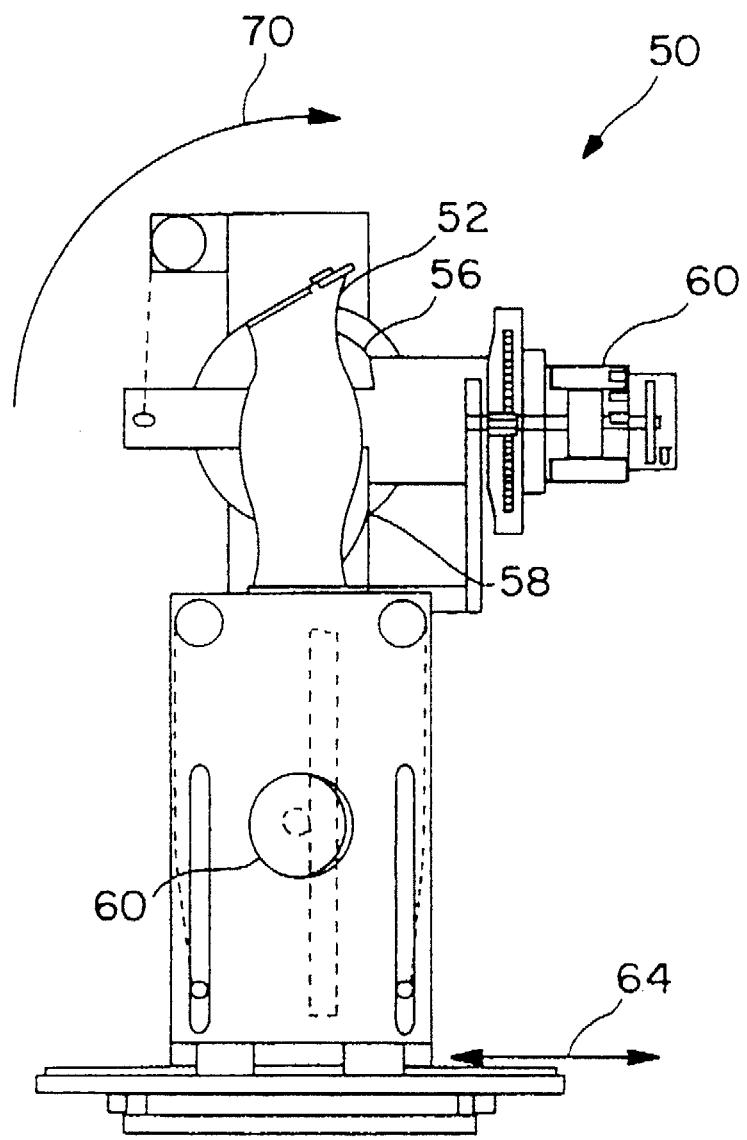
FIG. 5c presents a side view of a six-axis embodiment of the manipulator of the present invention.

FIG. 5a presents a front view of the manipulator, FIG. 5b presents a top view of the manipulator and FIG. 5c presents a side view of the manipulator. The manipulator levitates an aircraft-type sidearm-grip control stick (or handle) 52 which incorporates three queuing buttons 54, an analog trigger 56, and a palm-actuated deadman safety switch 58.

Force-feedback can be generated on each axis by the hand controller through 6 small, brushless, DC servo motors 60. The six axis force-reflection output and six axis orientation and position control makes the manipulation and "feeling" of multidimensional virtual objects extremely easy.

The kinematic arrangement of the invention is also shown in FIG. 5. The manipulator is arranged in a Cartesian coordinate system, and the degrees of freedom are denoted by an X-axis 62, a Y-axis 64, and a Z-axis 66 for translational motions, and a yaw-axis 68, a pitch-axis 70, and a roll-axis 72 for the rotational motions. The axes of these six independent degrees of freedom intersect at a single point which has been located within the handle 52 at a point which is just below where the—operator's second and third finger/knuckle rest on the handle. Locating the axes of motion in this way minimizes cross coupling between the degrees of freedom.

Referring again FIG. 3, the apparatus is attached to a work surface through the baseplate 74. The first two stages mounted up from the baseplate are a simple X-Y table driven by a rack and pinion, and held in place by two parallel rails or linear ways per stage. Because these axes work parallel to gravity, no compensation is required.

Figure 6A:
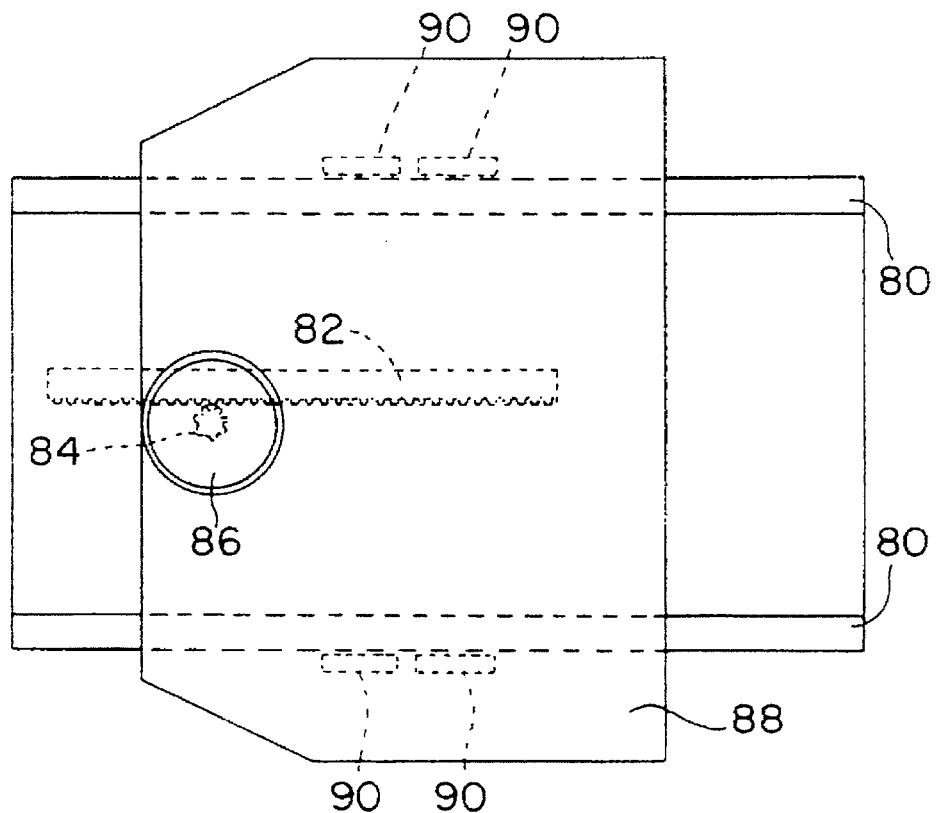
FIG. 6a presents a top view of the X portion of the X-Y table of an embodiment of the manipulator of the present invention.
Figure 6B:
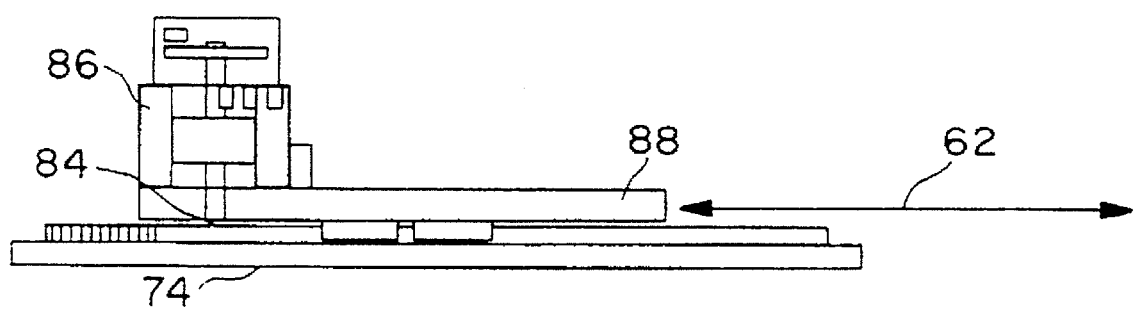
FIG. 6b presents a side view of the X-portion of the X-Y table of an embodiment of the manipulator of the present invention.

Referring to FIG. 6, FIG. 6a presents a top view of the X portion of the X-Y table and FIG. 6b presents a side view of the same. The X linear ways 80 and the X rack 82 are affixed to the baseplate 74. The X pinion 84 engages the rack 82 and is directly coupled to the X motor 86. The motor is affixed to the X plate 88. The X plate 88 translates via recirculating ball bearings 90 along the linear way 80, and carries the plate, motor, and pinion through translation along the X-axis 62.

Figure 7A:
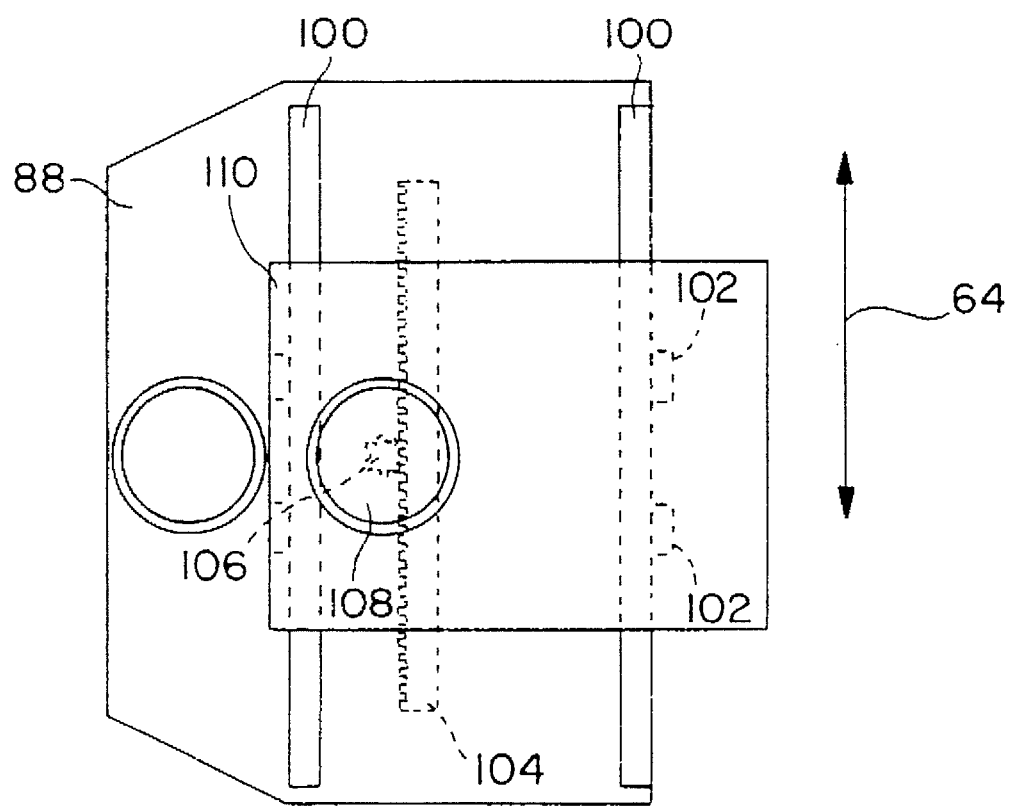
FIG. 7a presents a top view of the Y-stage of the manipulator of an embodiment of the present invention.
Figure 7B:
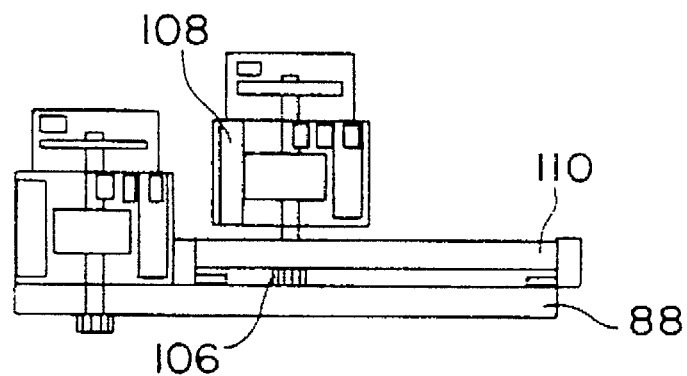
FIG. 7b presents a side view of the Y-stage of the manipulator of an embodiment of the present invention.

Y and Z translation stages are constructed in a similar fashion. FIG. 7a presents a top view of the Y-stage, and FIG. 7b presents a side view of the Y-stage. The Y-stage is affixed atop and carried by the X plate 88. This stage includes: the Y linear ways 100 and bearings 102, the Y rack 104, the Y pinion 106, the Y motor 108, and the Y plate 110 for translation along Y-axis 64.

Figure 8A:
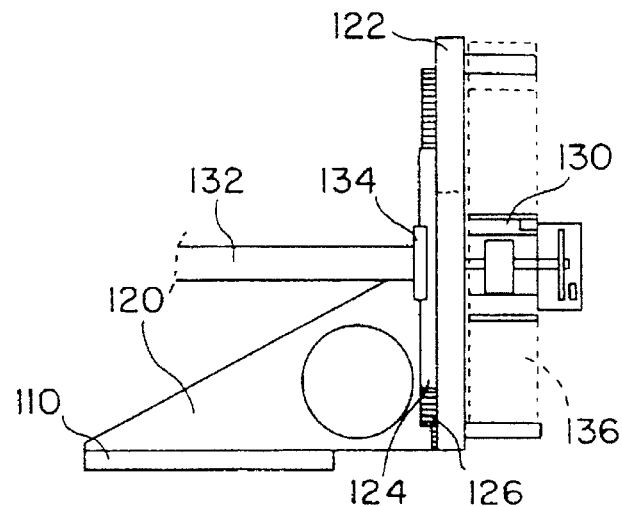
FIG. 8a presents the front view of the Z-stage of the manipulator of an embodiment of the present invention.
Figure 8B:
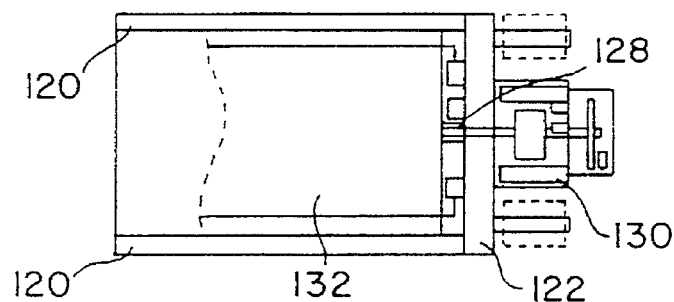
FIG. 8b presents the top view of the Z-stage of the manipulator of an embodiment of the present invention.
Figure 8C:
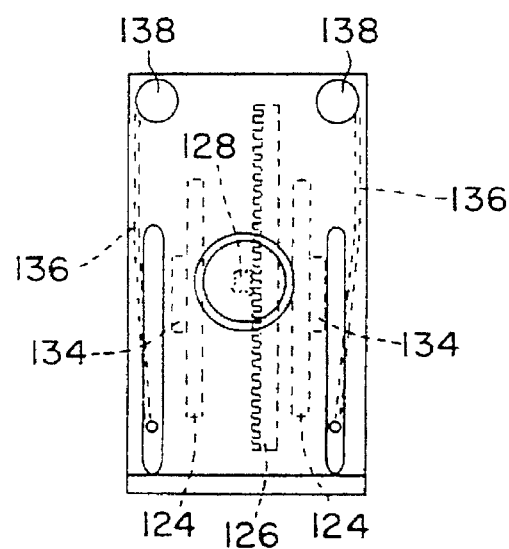
FIG. 8c presents the side view of the Z-stage of the manipulator of an embodiment of the present invention.

Referring to FIG. 8, the Z-stage is shown. FIG. 8a presents the front view of the Z-stage, FIG. 8b presents the top view of the Z-stage and FIG. 8c presents the side view. The Z-stage is affixed atop and carried by the Y plate 110 using two Z platform supports 120. The Z-stage includes: the Z plate 122, the Z linear way 124, the Z rack 126, the Z pinion 128, the Z motor 130, the yaw plate 132, the Z bearings and the carriage 134, the Z levitating springs 136 and the spring spools 138. This axis levitates the yaw, pitch, and roll mechanisms, and the structures to which they attach. However, the Z motor and gear train themselves do not levitate thus saving additional weight. The Z stage is easily gravity compensated by two springs of sufficient length such that a given displacement is small in comparison to the length. Thus, the force applied is relatively constant with respect to displacement. The force of the springs is upward so as to compensate for the force of gravity. The spring constants for these springs are matched to the upper stage weight.

Figure 9A:
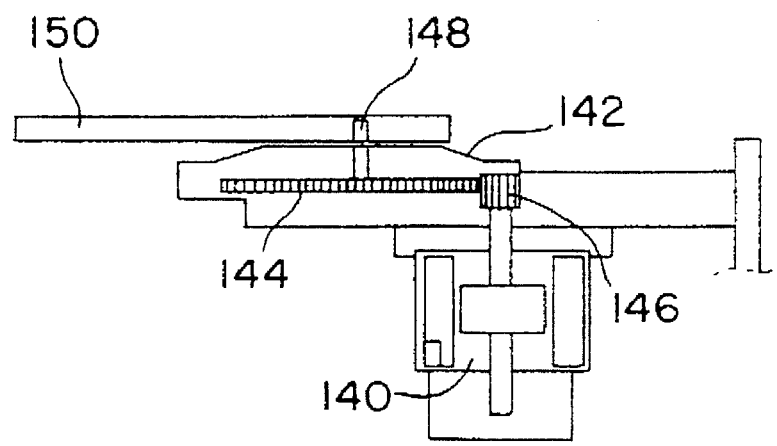
FIG. 9a presents a top view of the off-stage of the manipulator of an embodiment of the present invention.
Figure 9B:
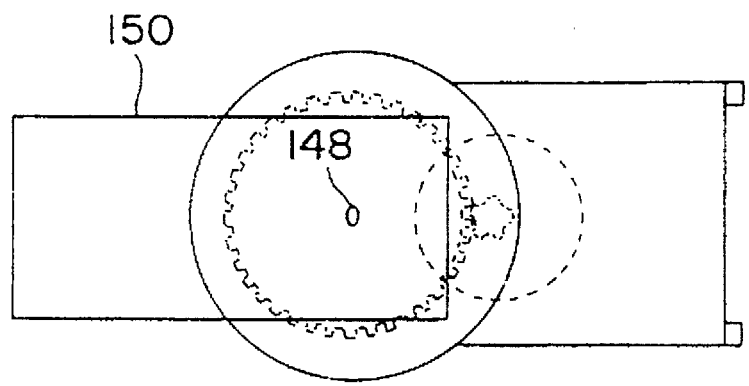
FIG. 9b presents the front view of the offstage of the manipulator of an embodiment of the present invention.

Attached to the Z plate 122 is the yaw stage. Referring to FIG. 9, the yaw stage is presented. FIG. 9a presents the top view of the yaw stage and FIG. 9b presents the front view of the yaw stage. The yaw stage is comprised of the yaw motor 140, which is coupled to the yaw gearbox 142 which contains a yaw spur gear 144 coupled to the yaw motor pinion 146. The output shaft 148 of gearbox 142 is affixed normal to the arm of yaw-pitch gimbal bracket 150. Because the yaw stage operates perpendicular to the Z plate and parallel to the baseplate, it does not need gravity compensation.

Figure 10A:
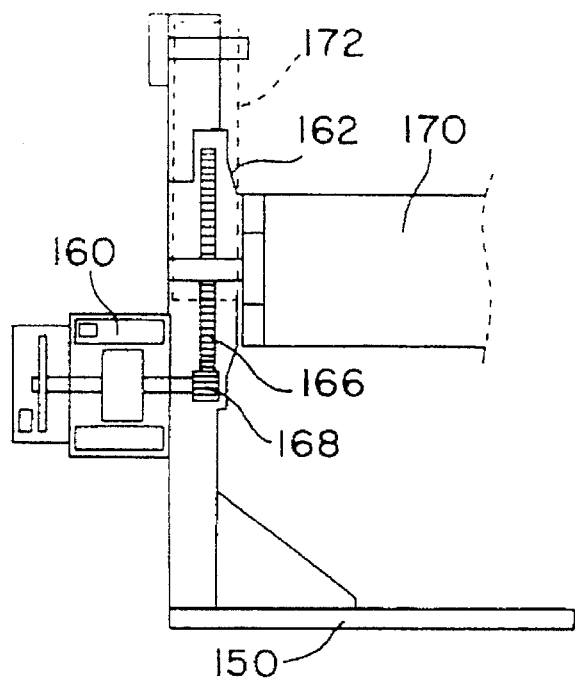
FIG. 10a presents a front view of the pitch-stage of the manipulator of an embodiment of the present invention.
Figure 10B:
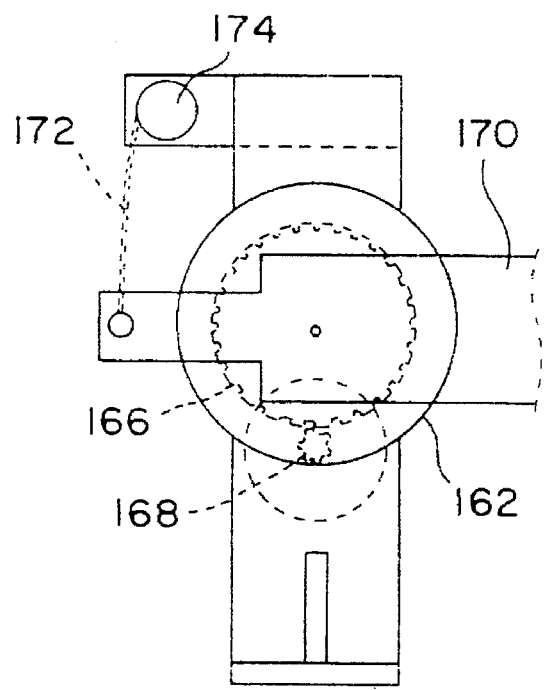
FIG. 10b presents a side view of the pitch-stage of the manipulator of an embodiment of the present invention.

Referring to FIG. 10, the pitch stage is shown. FIG. 10a presents a front view of the pitch stage and FIG. 10b presents a side view of the pitch stage. The pitch stage is comprised of the pitch motor 160, which is coupled the pitch gearbox 162 affixed to the yaw-pitch bracket 150. The pitch gearbox includes which contains a pitch spur gear 166 coupled to the pitch motor pinion 168. The output shaft of the gearbox is affixed normal to the vertical arm of the pitch-roll gimbal bracket 170. The weight of the roll axis and the pitch-roll gimbal is compensated by using a constantforce spring 172 with a spring spool 174. This does not provide perfect balance accept at the equilibrium position. However, the small centering force is easily overpowered by the pitch motor gear train and holding friction.

Figure 11A:
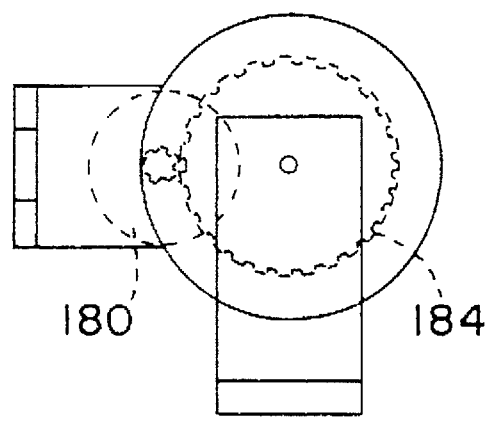
FIG. 11a presents a front view of the roll-stage of the manipulator of an embodiment of the present invention.
Figure 11B:
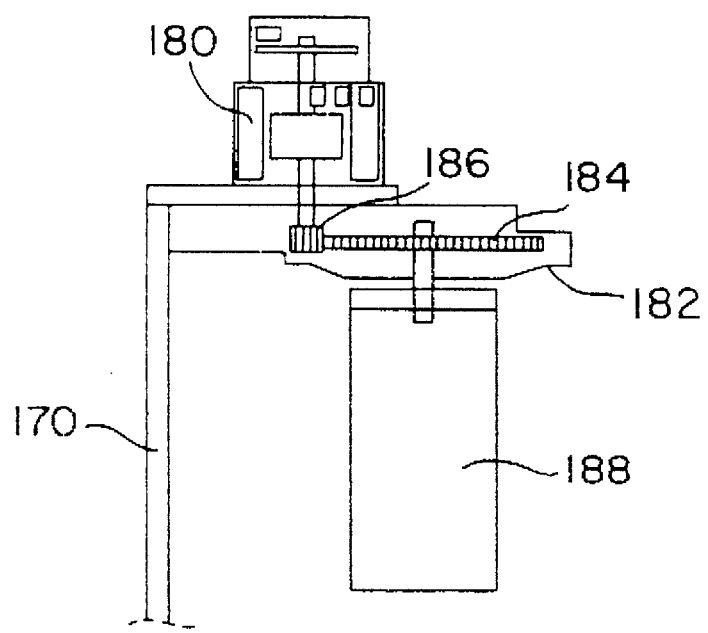
FIG. 11b presents a top view of the roll stage of the manipulator of an embodiment of the present invention.

Referring to FIG. 11, the roll stage is shown. FIG. 11a presents a front view of the roll stage and FIG. 11b presents a top view of the roll 25 stage. The roll stage is comprised of the roll motor 180, which is coupled to the roll gearbox 182 affixed to the pitch-roll bracket 170. Roll gearbox contains a roll spur gear 184 coupled to the roll motor pinion 186. The output shaft of the gearbox is affixed normal to hand grip plate 188. This last stage is not compensated because the handle components are quite light and nearly balanced.

Figure 12A:
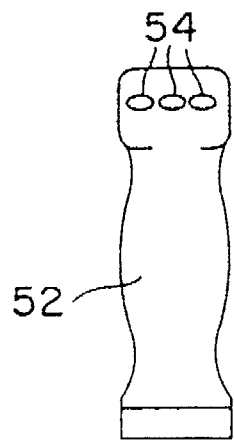
FIG. 12a presents a front view of the handle assembly of the manipulator of an embodiment of the present invention.
Figure 12B:
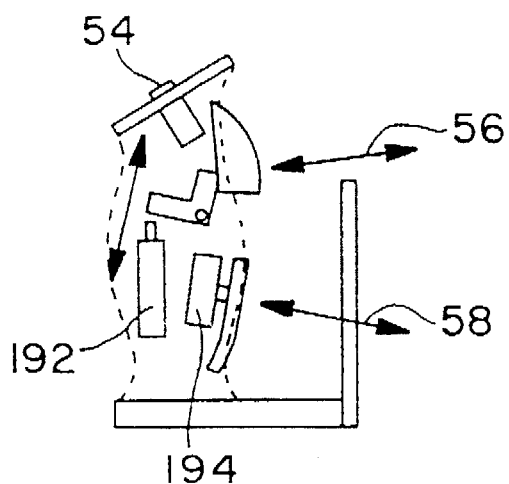
FIG. 12b presents a side view of the handle assembly of the manipulator of an embodiment of the present invention.

Referring to FIG. 12, the handle assembly is shown. FIG. 12a presents a front view of the handle assembly and FIG. 12b presents a side view of the handle assembly. The handle assembly is attached to the top surface of the hand grip plate 190 is the handle or hand grip 52, anatomically formed for either right of left hand usage, depending on the application. In addition, the entire hand grip is modular and can be conformed in a variety of sizes to meet the needs of a wide range of user hands.

Included as an integral part of the hand grip assembly are three switches 54, a trigger 56 which works through an L-shaped level to push a Linear Rheostat or an LVDT 192, and a palm grip 58 which works through depressing a limit switch 194. The switches 54 allow the operator to select software driver programmed modes of operation such as position, velocity, or force control, perform scaling between the hand grip motion and motion of the simulation, provide selection between one or more virtual reality force fields and/or selectively activate or deactivate particular joints of the hand controller.

The trigger grip provides a continuous change in resistive value as a function of depression or displacement, and can thus be used to actuate an end effector or other continuously controlled virtual mechanism.

The palm grip can be sensed as either pressed or not pressed, indicating whether the user has a firm grip of the handle assembly or not. Normally the software driver uses this switch to control hand controller safety functions—if it is not firmly pressed all active power to the hand controller actuators is interrupted. However, the switch can be sensed and decoded in the software driver as well.

All six axes of motion intersect at a point through the middle of the handle as previously discussed. This point is chosen to be the most comfortable pivot point for operation. Other embodiments of the invention can use alternative switches or small handle mounted finger actuated controls and may be configured with fewer that six axes or with axes which do not intersect at a single point.

The preferred embodiment of the present invention, uses a computer mediated control system and software driver an arbitrary mapping of position, velocity, acceleration, and force at the remote end (or within the virtual environment) can be presented to the operator (at the handle of the apparatus), and the position, velocity, acceleration, and force sensed at the handle or the apparatus can be arbitrarily mapped to an object within a remote or virtual environment). In the preferred embodiment the computer mediation is performed by a single computer and software driver, however, in other embodiments multiple computers can be used to enhance performance. In some embodiments the forces presented to a user can be generated through the sensing of actual forces from a remote device, through computation by an external model or simulation process, or through local computation with the apparatus control computer. This includes the functionality for presenting virtual force field objects and software programmed limits and stops to the user.

The preferred embodiment uses multiple back-drivable geared frameless brushless DC motors with rotational sensing to effect and control the superposition of translational displacement with force application and angular displacement with torque, thus providing arbitrary, programmed application of forces, torques, and displacements to the handle in any direction. Position sensing per axis is effected by using optical encoders. Velocity and acceleration estimates are made digitally from the sequence of positional measurements in the software driver. Force is set through current drive commands to the brushless DC motor drivers. These drivers set motor current using a pulse width modulation method and commutate motor phases using Hall effect switched circuits. Other embodiments may use alternative electrical actuators, translational or rotational transmissions, and/or alternative displacement/rotation measurement sensing methods.

Figure 13:
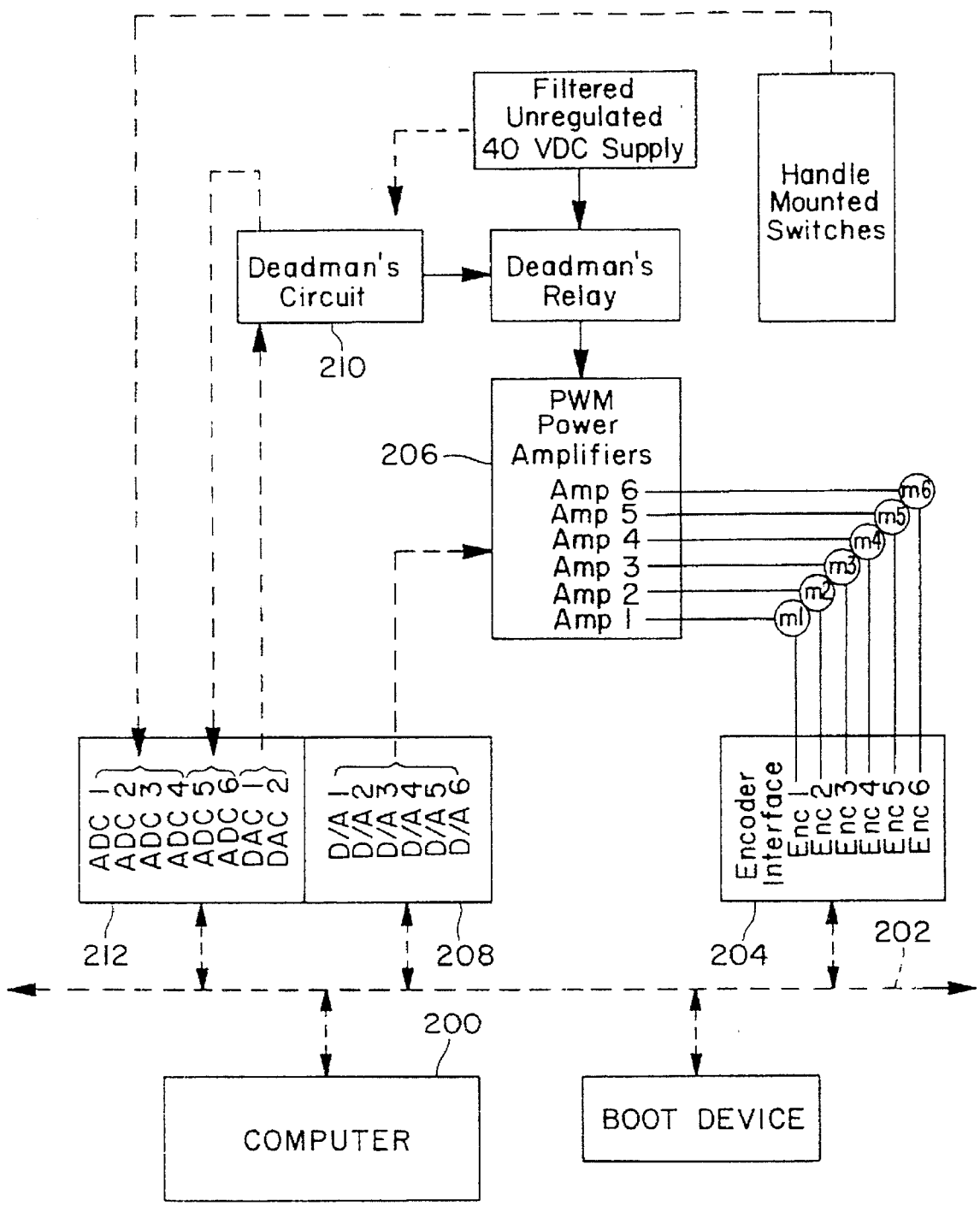
FIG. 13 presents a block diagram representation of the electronics module of an embodiment of the present invention.

The electronics module functionality is documented through description of FIG. 13. The module includes a computer 200 such as an IBM PC-AT or similar connected to a data bus 202. The computer implements a closed loop control system for the motors based upon the rotary position of each DC motor which can be sensed by a position encoder for each motor which can be mounted on each motor housing. The encoder output is made available to the computer controller through six encoder decoding channels 204. The computer synthesizes velocity and acceleration from periodic position readings. Each servo loop cycle computes new motor torque values derived from actually drive voltages for the PWM amplifiers 206. These programmed torque values are interfaced to the PWM amplifiers through six digital to analog interfaces 208.

A set of three Hall effect switches are provided for each motor. In alternative embodiments, brushless motor commutation can be accomplished using encoder position readings, however this makes mounting the encoder more difficult. A simpler approach is to use Hall effect switches which signal each phase change point. The PWM amplifiers in this input for commutation, or sinusoidal signals which could be generated from resolvers., The computer itself requires a device (typically a magnetic storage device such as a floppy disk or a hard disk) from which to load the servo control code. In other embodiments this software driver code can be located in Read-Only Memory or Optical Memory. The computer may also require a monitor and a keyboard to display status and input command sequences.

Because a digitally controlled servo system such as that used here can be dangerous on power up when many circuits are in unknown states or when the software crashes, a safety deadman's circuit 210 has been included in the design. This circuit locks out all power to the amplifiers and motors unless a valid initialization sequence has been performed and the software servo loop is running correctly. It also shuts down power if the servo loop fails.

Because unknown conditions can arise either from the handle itself of from other external devices with safe shutdown subsystems, the deadman's circuit also can power down the manipulator on an externally signaled failure or if the operator releases his grip on the handle allowing the deadman's switch to be released.

The deadman's circuit works as follows. When the hand controller is powered up, the deadman circuit will be inactive until a valid servo control system is in operation, either started by manual application start up or through the use of an automatic start-up command sequence initiated on computer interface system upon power-up.

When an active servo is established, a "Heart Beat" signal comprising an 37 Hz square wave (or faster) signal from analog to digital/digital to analog converter set 212 (ADC-DAC-1), is generated by the interrupt servo loop. This signal is required for power to be applied to the power amplifiers and therefore the motors. If a hardware or software "crash" occurs the "Heart Beat" will normally stop, cutting power to the power amplifiers and releasing actuation to the handle within 1/60th of a second.

The palm switch 56 must be depressed to power the motors under normal conditions. However, this switch can be overridden by setting the ADC-DAC-2 output to logical zero; this line is normally at logical one 25 after servo loop initialization. An external "conditional panic" switch can be connected which can also be overridden under software control by wiring it in parallel to the Deadman's handle switch.

An unconditional panic switch can be wired by connecting a switch from the ADC-DAC 1 output to signal ground. This switch will stop the "Heart Beat" signal and simulate the occurrence of a software/hardware failure—thus dropping power to the stick. The panic switch should be a push-type permanent contact type switch because power will return to the stick if the "panic" stop is removed.

Figure 14:
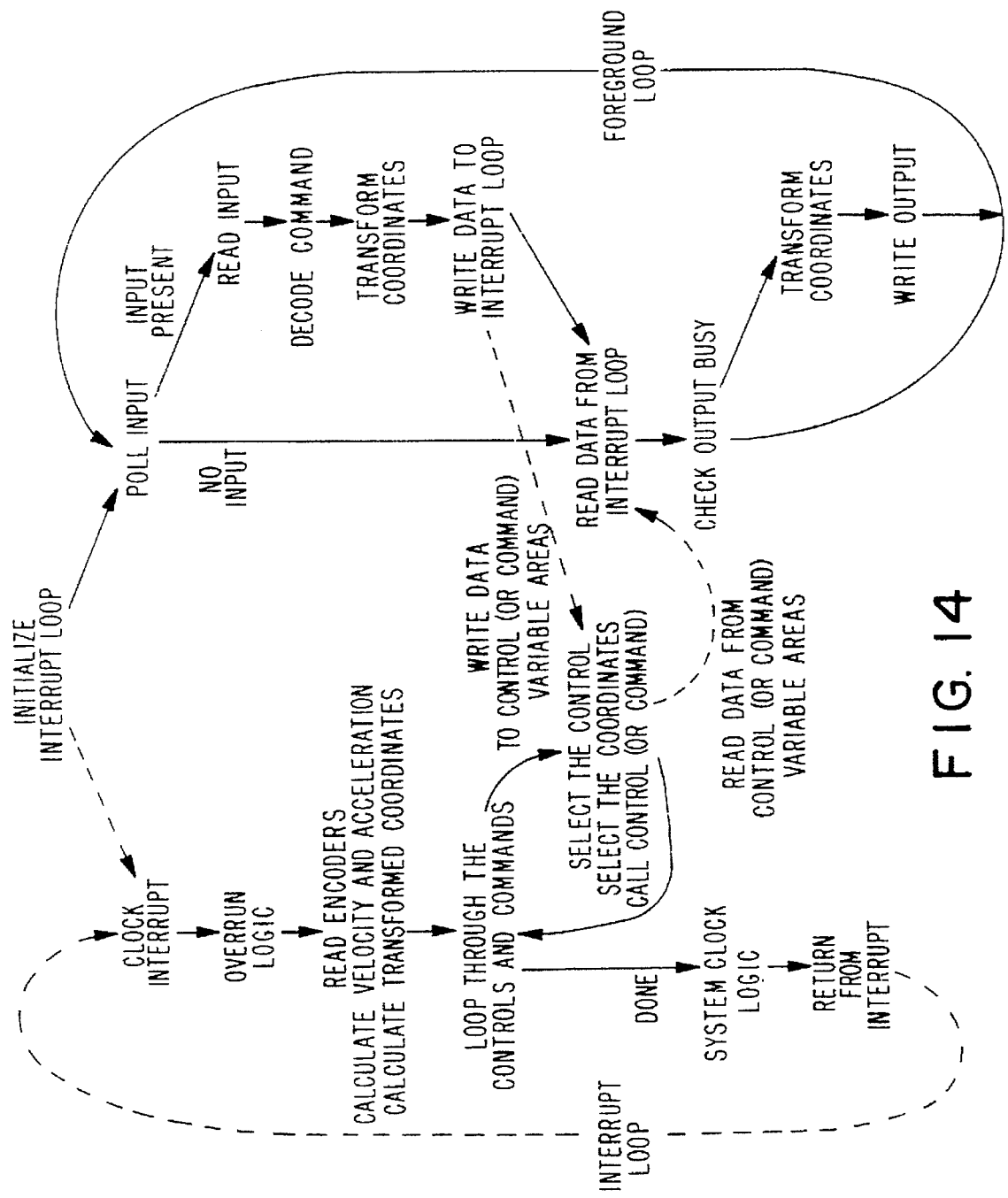
FIG. 14 presents a software driver for an embodiment of the system of the present invention.

The software driver functionality for the system is explained with reference to FIG. 14. A servo shell process begins by initializing the interrupt loop data structures and linkages. After this is completed, the interrupt process runs every clock interval to provide the servo routines with a deterministic time base. In the PC-AT version of the software driver, this clock interrupt is a re-programmed use of the system clock/timer. other embodiments using alternative control computer architectures can use alternative timing signals/mechanisms.

The user initializes the desired time interval for his servo loop (shorter for crisper response—longer to accommodate longer interrupt processing loops). The timer interrupt is skipped until enough ticks have been seen to represent this programmed interval. Then the interrupt level servo logic is executed.

If interrupt processing is skipped, control is immediately transferred to the system clock logic which either exits the interrupt or sends the execution flow into the operating system clock processing code (if 1/60th of a second has passed since the last time the 30 system clock code was executed). This system clock logic keeps the computer time of day correct and is required in many systems for proper operations of the floppy disks.

If the interrupt routine determines that it is time to run the servo code, it first checks (in the overrun logic) to see if a previous call to the servo routines is still being processed (this is done via interlocking flags). If the last loop has not yet completed, i.e. there are too many commands or controls to be executed in the user programmed interrupt call-back period, an overrun is signaled and the new interrupt is rejected until the old one is fully completed, also servo calculations compensate time normalization based on the overrun information—in effect, when overrun occurs, it is as though the clock interval has been doubled in duration.

When the servo loop begins to run, it first collects each encoder value, computes estimates for velocity and acceleration, and then computes an optional set of translations, scales, and rotations on the XYZ data and the pitch, roll, yaw data. This global transform allows the entire servo function space to be rotated, shifted, or scaled to create different force field "views" This is analogous to changing the view port to a 3D model in model 3D graphics engines.

After preprocessing position data from the encoders, the servo loop enters a set of processing routines which iterates down a list of installed control functions and commands. A control is eligible for execution if the coordinates to be sent to it are inside of its bounding box. When a control function executes it reads its own local memory which can contain values sent in by the non-interrupt loop, a set of 6 coordinates, velocities, and accelerations, either untransformed or transformed, and computes a set of six torque contributions. The only difference between a control and command is that a control is expected to generate a force contribution, whereas a command is simply executed. Also commands can be flagged to run either before or after the list of controls.

The force contributions to the various axes are appropriately scaled and applied to a running sum of contributions (which are summed across multiple control function calls). When the control/command function lists are completed, the resulting final set of forces (or torques) become the values set into the output digital to analog interfaces.

After starting the interrupt "loop", the foreground also establishes a loop. This loop consists of polling for input from the command serial port and output from the interrupt loop and processing these inputs and outputs if present. If serial input becomes available, it is read and decoded. For a typical master-slave protocol, the input will consist of slave positions or forces which are transformed from native slave coordinates to scaled master Cartesian coordinates and which are then used to update gains, center locations, or forces in one or more interrupt level servo functions to create a force "feel". The output from the loop will typically be center locations or offsets which are transformed back to slave coordinates and transmitted out of the serial port. Polling of the stick buttons, triggers, panic buttons, power supply level will also normally be performed as well.

Because the user actually installs pointers to his own control and/or command code, complete flexibility is available from the servo structure. Several different virtual controls are described below.

Detents

Figure 15A:
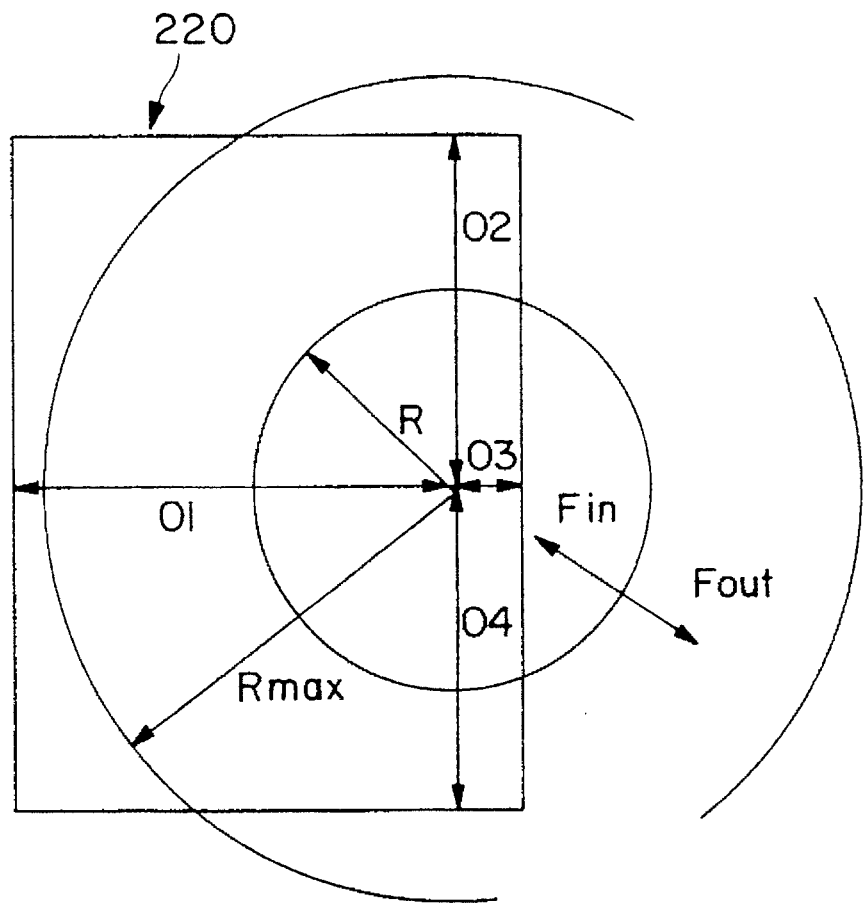
FIG. 15a presents a graphical two-dimensional representation of a detent of one embodiment of the present invention.

Consider trying to implement a "feel" which is similar to a spring loaded ball bearing falling into a dimple. This class of "feel" is a detent. A two dimensional representation of a detent is shown in FIG. 15a. Bounding box 220 has a center at coordinates (Xc, Yc) and is defined by $$Xc-01<X<Xc+03$$

$$Yc-02<Y<Yc+04.$$

The detent computes and applies a force contribution, Fin/Fout, to the hand controller actuators only if the hand controller joint coordinates, X and Y, are within bounding box 220. If this is true, the force contribution is computed as a function of the distance, D, from the detent center, Xc, Yc. The distance is defined as:

$$D = \text{Square Root}((X-Xc)2+(Y-Yc)2) \quad [1]$$

For cases where D is larger that Rmax, the force contribution, Fin and Fout, are [0,0]. For cases where D is less that R, Four is zero and Fin is computed as a force directed toward the center, Xc, Yc, from the current joint coordinates, X, Y. This computation is as follows:

$$Fin=[X-Xc\ Y-Yc]*(-kin*D-velocity*din+Kin).$$

Where velocity is computed from successive D measurements (in turn, computed from successive joint coordinate values, X, and Y, through equation [1] above), kin is the inner radius, R, spring constant, din is the inner radius velocity damping factor, and Kin is the inner radius status force term.

For cases where D is less than Rmax but greater than R, Fin is zero and Four is computed as a force directed away from the center Xc, Yc, starting at the current joint coordinates, X, Y. This computation is as follows:

$$Fout=[X-Xc\ Y-Yc]*(-kout,(Rmax-D)-velocity*dout+Kout)$$

Where velocity is computed from successive D measurements (in turn, computed from successive joint coordinate values, X, and Y, through equation [1] above), kout is the outer radius spring constant, dout is the outer radius velocity damping factor, and Kout is the outer radius static force term.

Figure 15B:
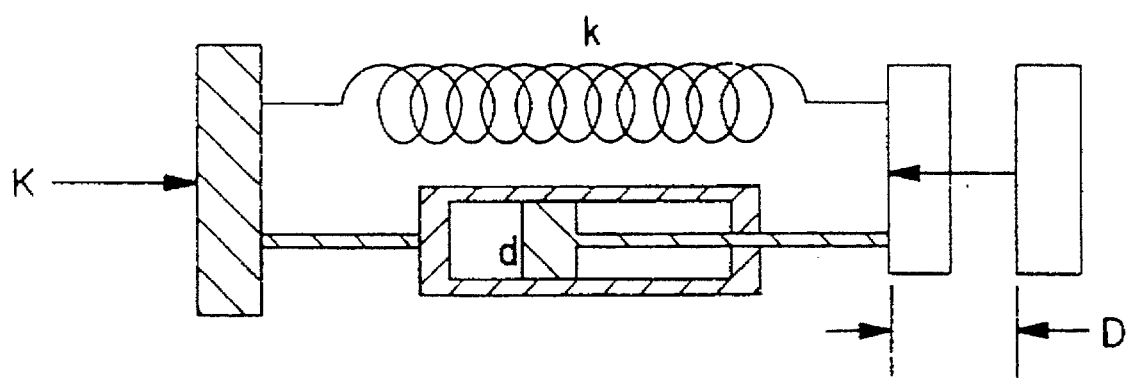
FIG. 15b presents a schematic representation of a spring system used in implementing a detent of one embodiment of the present invention.

FIG. 15b shows the basis for the force contribution computation as a lumped parameter mechanical system composed of a damping cylinder with damping factor d, a spring with spring constant k, and a static force, K.

Note that higher dimensionality detents can also generate hyperplanes and hyperspheres by having fewer or more axes enter into the basic distance computations. "Inside out" or "half side" versions can be made by changing gain signs or setting some gains to zero. This formulation of the detent is a superset of the more familiar PID controller.

Edges/Position Limits

Because enforcement of software programmed limit stops is needed, and because there are often quite a few of them (12 per axis is typical), it is advantageous to reduce the computation of the previous example into a more efficient and degenerate form. This can be done by dropping out the appropriate terms leaving:

$$force = -k*(X-X_L); \text{ For an X Limit}$$

$$force = -k*(Y-Y_L); \text{ For a Y Limit}$$

$$force = -k*(Z-Z_L); \text{ For a Z Limit}$$

where $X_L$, $Y_L$, and $Z_L$ are limit stop locations.

Velocity Limits

The same idea can also generate a form which provides velocity damping only (or velocity limits if a non-linearity is introduced):

$$force = -velocity*d;$$

where d is the damping factor and velocity is computed from the difference between successive joint position measurements.

Power Management Considerations

In a force-reflecting device, it is desirable to have a device which is as "massless" as possible, so that the operator feels a force without any mass being associated with it. One technique to achieve more strength or power is to use gearing for leverage, but this approach is only effective to a certain extent because the more of that leverage you add, the less the device is capable of back drivability. In other words, the added strength results in more inertia by way of the drive stage in the motor, which is then amplified by the gear transmission. Another approach is to use high strength-to-weight actuators, which is best achieved by driving the motor at its peak performance. If this is done for an extended period of time, however, the motor will burn out. One solution is to cool down the motor, but the addition of a fan and related hardware adds power and expense not suited to lower-priced products. Whereas the various components may simply be oversized in an industrial robotics type application, adding mass in consumer type environments may result is a large penalty.

It turns out in force reflecting applications that the maximum application of force is required that often nor necessary for prolonged periods. To a certain degree, such peak performance is only required when first touching the representation of an object, at which point it is common practice to "back off" from it anyway. To improve performance yet manage power, the system may take advantage of the fact that most motors have two ratings. One is a nominal consumption-type rating associated with average current during operation. This rating is also a direct function of the degree of heat dissipated by the motor in a steady-state sense; that is, how much heat the motor windings can endure before they start melting. Most motors also have a peak rating, however, which is much higher, often twice as high as the nominal. This value is related to how much power the unit can handle in an instantaneous sense, despite the amount of heat generated.

To at least momentarily operate in this peak torque mode, the average power requirements are monitored and integrated with respect to time in a background mode. In the event that this integral of power over time exceeds the average, the control system cuts back the peak power. Thus, according to one aspect of the invention, the system is capable of operating in peak mode, but with a "correction factor" in the event that the average power envelope over a predetermined time period has been exceeded. For example, this integral may be averaged over the last two seconds more or less, depending upon the circumstance.

Transforms

Figure 16:
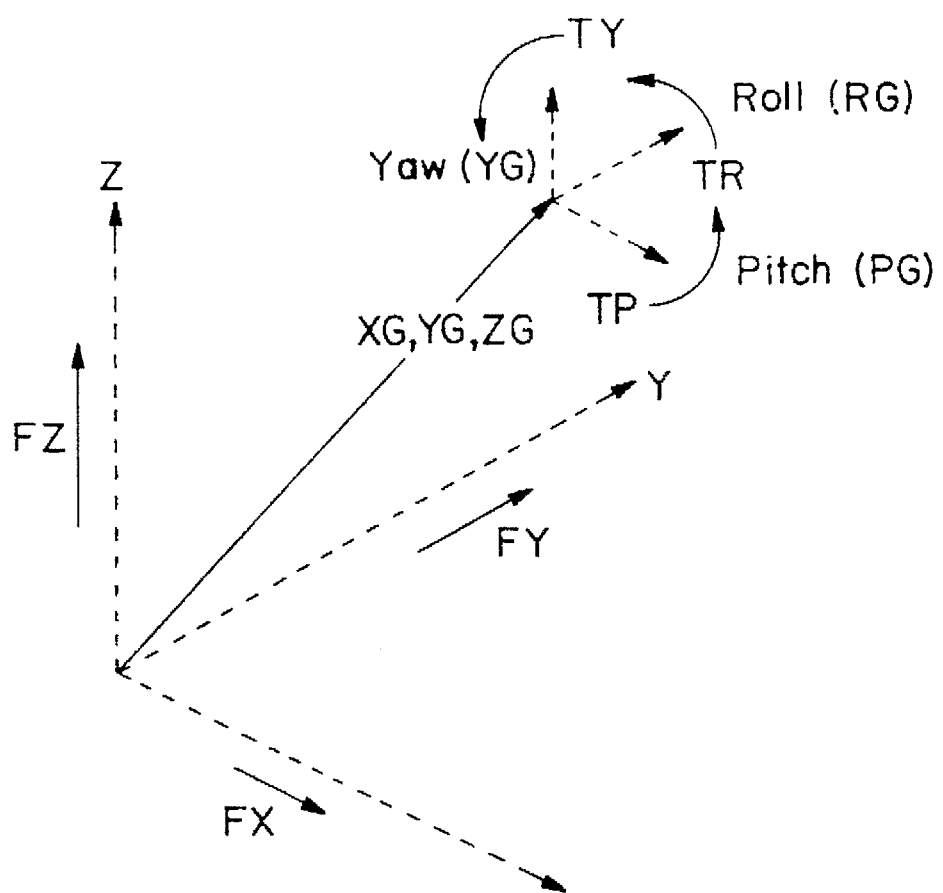
FIG. 16 represents a graphical representation of three axes of coordinate transformations for one embodiment of the present invention.

The controller creates alternative transformed coordinates using homogeneous coordinate transformations. Transforming controls computation into a new coordinate frame also requires transformation of the partial force contributions back into the frame of the hand controller (so that they can be applied as joint forces and torques. This is done as shown in FIG. 16 (shown for three axes only).

As a way to place a detent at a new X, Y, Z offset and a new orientation P, R, Y we can transform stick coordinates as follows before detent evaluation:

$$X' = S*[W]X + [X_o] \text{ and } O' = [O] + [O_o],$$

where W is a rotation matrix, $X_o$ is a translation vector, S is a scale factor and $O_o$ is a pitch, roll, yaw offset. When detents are computed in this new coordinate system the resulting forces and torques, FX', FY', FZ', must be reverse transformed into native coordinates prior to application. To translate the forces they are decomposed into their components in the original hand controller X, Y, and Z coordinate system and summed. This can be done by applying the transform W to three unit vectors, ax=[1,0,0], ay=[0,1,0], az=[0,0,1], oriented along the hand controller coordinates, X, Y, and Z unit vector to get their forms, ax', ay', az', in the transform space:

$$ax' = [W]ax, \; ay' = [W]ay, \; az' = [W]$$

Then force components can be computed in native hand controller space, FX, FY, FZ, by adding the dot products with ax', ay', and az'as follows:

$$FX = FX' \cdot ax' + FY' \cdot ax' + FZ' \cdot ax'$$

$$FY = FX' \cdot ay' + FY' \cdot ay' + FZ' \cdot ay'$$

$$FZ = FX' \cdot az' + FY' \cdot az' + FZ' \cdot az'$$

To translate the torque we follow a similar procedure using $a_{YG}$, $a_{RG}$, and $a_{RG}$, and TY, TR, and TP.

While the best mode for carrying out the invention has been described in detail, those familiar with the art to which this invention relates will recognize various alternative designs and embodiments for practicing the invention as defined by the following claims.

We claim:

1. A method for providing tactile force feedback in response to a user position and orientation, the method comprising the steps of:

storing data representative of a computer model, including one or more objects having surfaces;

generating an electrical signal for each of a plurality of degrees of freedom of the user as a function of the user position and orientation;

synthesizing user velocity and acceleration from the electrical signals to determine user-applied force;

mapping the user position, orientation and applied force with respect to computer model to determine interactions between the user and any objects included in the model;

generating at least one force field in response to the interactions;

generating a force signal for each degree of freedom as a function of the force field; and directing a tactile force on the user for each force signal, the generated tactile forces providing the tactile feedback.

2. The method of claim 1 wherein the number of degrees of freedom is two or more.

3. The method of claim 2 wherein the step of generating the electrical signals includes the step of sensing position and orientation of the user's hand and wherein the tactile forces are directed to the user's hand.

4. The method of claim 1, wherein the step of synthesizing user velocity and acceleration from the electrical signals to determine user-applied force includes the step of sampling the electrical signals at regular intervals to synthesize estimates of user velocity and acceleration.

5. The method of claim 1, further including the step of computing a torque contribution associated with each degree of freedom based upon user position, orientation and applied force to assist in determining the interaction between the user and any objects of the model.

6. The method of claim 5, further including the step of applying the torque contributions to a running sum of such contributions.

7. The method of claim 1, further including the step of generating an altered force field view by performing a mathematical transformation on the position and orientation data.

8. A system for providing tactile force feedback in response to a user position and orientation, the system comprising:

a multi-axis interface device including an actuator for each axis and a member movable by the user, the interface device being responsive to the position and orientation of the member to generate electrical signals representative of the position and orientation of the member; and a programmed computer operative to:
store data representative of a computer model, including any objects associated therewith,
analyze the position and orientation of the member relative to the objects to determine any interaction therebetween,
generate at least one force field in response to the interaction, and
generate a force signal for each axis of the device as a function of the force field, wherein the actuators are responsive to their respective force signals to provide a force to each axis of the device for creating the force feedback.

9. The system of claim 8 wherein the computer model is associated with computer-aided design.

10. The system of claim 8 wherein the member includes a handle gripable by the user.

11. The system of claim 8 wherein the virtual reality force field includes limits and stops implemented by the computer program.

12. The system of claim 11, including a force limit based upon velocity.

13. The system of claim 11, including a power limit based upon the integral of average power consumption with respect to time.

14. The system of claim 8 wherein the means for generating is capable of generating a plurality of force fields, and wherein the member includes a switch means for selecting one of the force fields.

15. A locally self-contained system for providing tactile feedback in response to a user position and orientation, comprising:

(a) a multi-axis, user-moveable member including an actuator and position sensor dedicated to each axis;

(b) an interface device in communication with each actuator and each position sensor, the interface device being operative to:
generate an electrical signal representative of the position and orientation of the member, and
activate one or more of the actuators in response to a received force signal;

(c) a programmed computer in communication with the interface device, the computer being programmed to perform the following functions:
receive an electrical signal from the interface device representative of the position and orientation of the member with respect to time,
determine a user-applied force to the member by synthesizing velocity and acceleration from the periodic position readings,
generate at least one virtual reality force field in response to the user-applied force,
generate a force signal as a function of the force field, and
output the force signal to the interface device.

16. The locally self-contained system of claim 15, wherein the actuator and position sensor associated with a particular axis are in physical communication with one another, enabling the superposition of translational displacement with force application, and angular displacement with torque, thereby permitting an arbitrary, programmed application of forces, torques and displacements to the member in any direction.

17. A method of balancing power consumption of a manipulator having a peak torque mode and an average power rating in a tactile-feedback environment, comprising the steps of:

operating the manipulator primarily in the peak torque mode;

at least periodically integrating the average power consumed by the manipulator as a function of time; and backing off from the peak torque mode, at least momentarily, in the event the average power rating of the manipulator has been exceeded.

18. The method of claim 17, including the step of continuously integrating the average power consumed by the manipulator as a function of time.

* * * * *